(12) United States Patent
Kamensky

(10) Patent No.: US 10,206,540 B2
(45) Date of Patent: Feb. 19, 2019

(54) CUTTING BOARD ASSEMBLY

(71) Applicant: Cristine Kamensky, Castro Valley, CA (US)

(72) Inventor: Cristine Kamensky, Castro Valley, CA (US)

( * ) Notice: Subject to any disclaimer, the term of this patent is extended or adjusted under 35 U.S.C. 154(b) by 152 days.

(21) Appl. No.: 15/330,308

(22) Filed: Sep. 2, 2016

(65) Prior Publication Data
US 2018/0064290 A1    Mar. 8, 2018

(51) Int. Cl.
*A47J 43/25* (2006.01)
*A47J 47/00* (2006.01)
*B26D 3/28* (2006.01)

(52) U.S. Cl.
CPC ............. *A47J 47/005* (2013.01); *A47J 43/25* (2013.01); *B26D 3/283* (2013.01); *B26D 2003/286* (2013.01)

(58) Field of Classification Search
CPC ........... A47J 47/00; A47J 47/005; A47J 47/16
See application file for complete search history.

(56) References Cited

U.S. PATENT DOCUMENTS

| | | | | |
|---|---|---|---|---|
| 2,343,448 | A * | 3/1944 | Fay | B26B 29/063 83/461 |
| 4,243,184 | A * | 1/1981 | Wright | A47J 43/25 241/273.2 |
| 5,363,755 | A * | 11/1994 | Liang | A47B 77/02 241/273.2 |
| 5,386,978 | A * | 2/1995 | Ladwig | A47J 47/005 269/289 R |
| 6,371,470 | B1 * | 4/2002 | Ward | A47J 47/005 269/13 |
| 2005/0011912 | A1 * | 1/2005 | McGuyer | A47G 19/34 222/367 |
| 2007/0001359 | A1 * | 1/2007 | Pearl | A47J 47/005 269/289 R |
| 2008/0277856 | A1 * | 11/2008 | Tortora | A47J 47/005 269/289 R |
| 2008/0296823 | A1 * | 12/2008 | Pourounidis | A47J 47/005 269/289 R |
| 2012/0153554 | A1 * | 6/2012 | Ito | A47J 47/005 269/289 R |
| 2013/0313350 | A1 * | 11/2013 | Baranoff | A47J 47/005 241/101.2 |

* cited by examiner

*Primary Examiner* — Tyrone V Hall, Jr.
(74) *Attorney, Agent, or Firm* — Christopher Peil; Law Office of Christopher Peil

(57) ABSTRACT

A cutting board assembly with a rigid planar member, a circular segmented tray member, a plurality of supports, a plurality of non slip feet, a tray turning knob, a rotary bearing assembly and a food retaining curb. The planar member has an aperture matching the perimeter of one segment of the tray member. The tray turning knob is located at the center of the planer member. The rotary bearing assembly is mounted to the underside of the tray. The supports and non slip feet hold the rigid planar member up and prevent it from sliding during use. The food retaining curb is attached to either the left or right side of the rigid planar member, enabling a user to cut items and slide them into one of the tray segments and turn the tray so that a new segment of the tray is available for receiving additional cut items.

3 Claims, 4 Drawing Sheets

CUTTING BOARD ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of kitchen accessories and more specifically to a cutting board assembly.

The concept of using a board to cutting board as a surface for chopping fruits, vegetables, fish or meat is well known. The cutting board protects other surfaces such as counter tops or kitchen table tops from becoming nicked or scratched by a knife during the cutting process. Cutting boards are made in a variety of materials including wood and plastic.

On some occasions, a user wishes to cut a variety of different food items when preparing a meal and wishes to place the items in a bowl or plate for future use. To this effect, it is preferable to have the cutting board in close proximity to the waiting bowl so that the cut food can be slid easily into the bowl or plate.

There is a record of several such designs that take into account the close proximity of the cutting board to a bowl or plate. Including U.S. Pat. No. 8,220,789 by Harry Pourounidis that shows a plurality of cups attached to the underside of a cutting board so that food can be slid into them.

However, there is a deficiency in the prior technology in that the multiple cups shown in the Pourounidis patent take up valuable space that could be used for cutting.

Therefore there is a need for a cutting board where a plurality of receiving bowls is in close proximity and easily and quickly available to the cutting board surface, but do not take up valuable space on the cutting board.

BRIEF SUMMARY OF THE INVENTION

The primary object of the invention is to provide a cutting board assembly that allows a person to cut items and easily move them quickly and easily to one of a plurality of food holding compartments located in very close proximity to the cutting board without taking up valuable space on the cutting board.

Another object of the invention is to provide a cutting board assembly that allows a person to slide waste items into a sink or other disposal area.

Another object of the invention is to provide a cutting board assembly that includes a restraining curb that can be adjusted to one side of the cutting board or the other.

A further object of the invention is to provide a cutting board assembly that includes a method of attaching a grater or mandolin to an aperture in the cutting board located directly over the segmented tray.

Yet another object of the invention is to provide a cutting board assembly that includes slip resistant feet to help prevent movement of the cutting board during use.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a cutting board assembly comprising: a rigid planar member oriented in a horizontal direction, a segmented tray member, a plurality of vertically directed support members, a plurality of non slip feet members, a tray turning knob, a rotary bearing assembly, a food retaining curb member, said rigid planar member having a first aperture matching the perimeter of one segment of said segmented tray member, said rigid planar member having a second aperture capable of receiving said tray turning knob, said segmented tray member being circular in shape and having a plurality of segments radiating around the perimeter of said tray, said segmented tray member having said tray turning knob centrally attached to the upper surface of said tray, said rotary bearing assembly centrally mounted to the underside of said segmented tray member, said vertically directed support member fixedly attached to the underside of said rigid planar member, said non slip feet members fixedly attached to the underside of said vertically directed support members, said food retaining curb member is removably attached to either the left or right side of said rigid planar member, enabling a user to cut items on the top surface of said rigid planar member and slide them into one of the segments of the said tray member and turn said tray member by rotating sad turning knob so that a new segment of said tray is available for receiving additional cut items.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
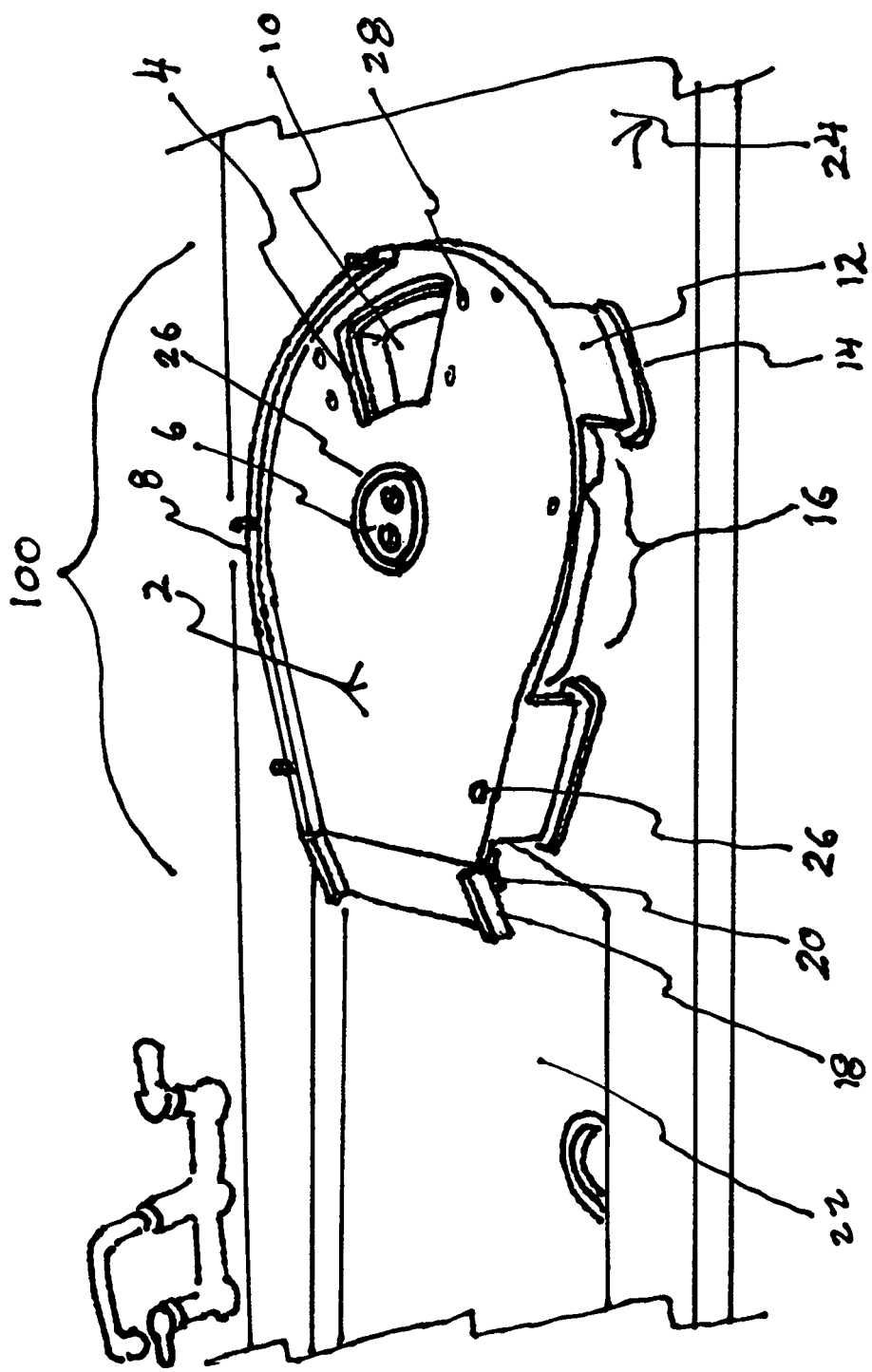
FIG. 1 is a perspective view of the invention.

Referring now to FIG. 1 we see a perspective view of the invention 100. A rigid planar surface 2 acts as a cutting board and is oriented in a horizontal position on a kitchen counter top 24 adjacent to standard sink 22. The cutting board surface can be made of wood or plastic such as high density polyethylene. Vertical legs 12 hold the planar surface 2 up approximately two inches allowing a segmented tray 16 to be positioned underneath. Feet 14 include a layer of non slide rubber which helps prevent the cutting board 2 from sliding during use. A first aperture 4 is cut to the shape of the perimeter of a tray segment 10 so that when a person cuts food on the cutting board 2, he or she, when finished cutting, can slide the cut food into the tray segment 10. The user can then turn knob 26 located in a second aperture 6 in the cutting board to rotate the tray 16 and bring an empty tray segment into view within aperture 4. A curb 8 is located at the far side of the cutting board and prevents food items and juices from falling off the far side. If the cutting board is to be placed on the left side of the sink 22, the curb 8 can be lifted off and placed on the opposite side of the cutting board and held in place via insertion holes 26. Insertion holes 28 allow a person to place a mandolin slicer or a grater plate over the aperture 4 so that sliced or grated food items can fall directly into a tray segment 10. Optional downwardly sloping panel 18 allows waste food items to more easily slid into the sink for disposal. Hinge member 20 allows the sloping panel 18 to be folded in when not needed.

Figure 2:
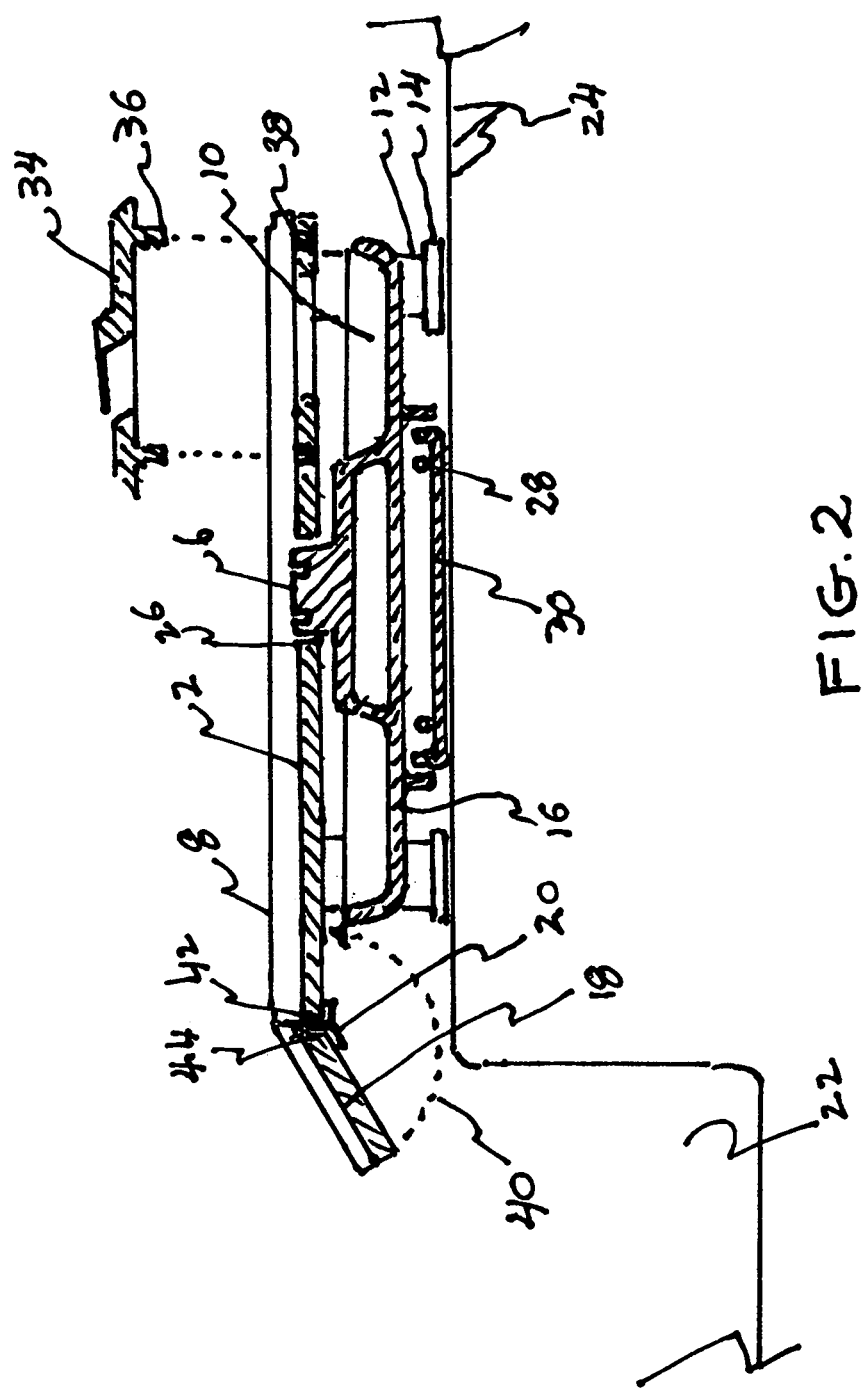
FIG. 2 is a side section view of the invention.

FIG. 2 is a side section view of the invention. Tray 16 can be seen sitting under rigid panel 8. The underside of tray 16 includes a roller bearing assembly 28, 30 similar to a standard lazy susan device that allows the tray to rotate with very little effort. There is a small space between the top of the tray 16 and the underside of the cutting board 2 so that the tray can turn freely when a person engages the turning knob 6. the turning knob is flush with the top of the cutting board 2 so that it does not interfere with cutting activity. Removable and replaceable grater 34 or mandolin can be plugged into the top of the cutting board 2 via posts 36 and holes 38. In this way, the user can grate or slice food items and have them fall directly into the tray segment 10. Hinge member 20 allows the sloping panel 18 to fold in as shown be dotted line 40. The sloping panel 18 is held in position by magnet 42 and ferrous insert 44 or other standard means.

Figure 3:
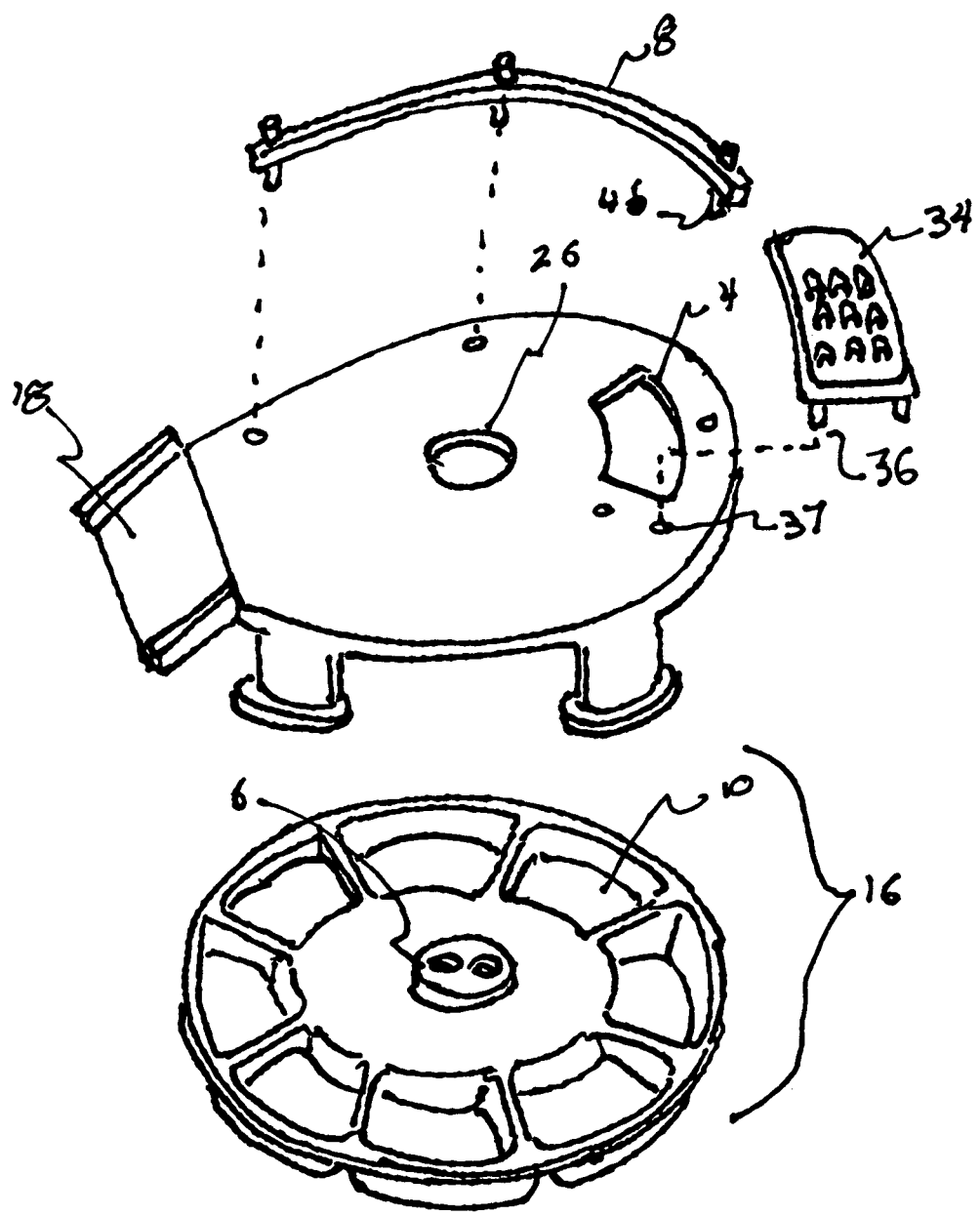
FIG. 3 is an exploded view of the invention.

FIG. 3 is an exploded view of the invention. curb member 8 is removably retained by posts 46 and apertures 26. The curb 8 can be flipped over and posts 48 can engage apertures 27 on the opposite side of the cutting board 2 to accommodate sitting on the left hand side of a sink. Grater 34 or mandolin 32 can be plugged into apertures 37 via posts 6 when needed. When the user is finished chopping food items he or she can lift the cutting board assembly up and away from the tray 16 thereby gaining access to all cut items residing in the various tray 16 segments.

Figure 4:
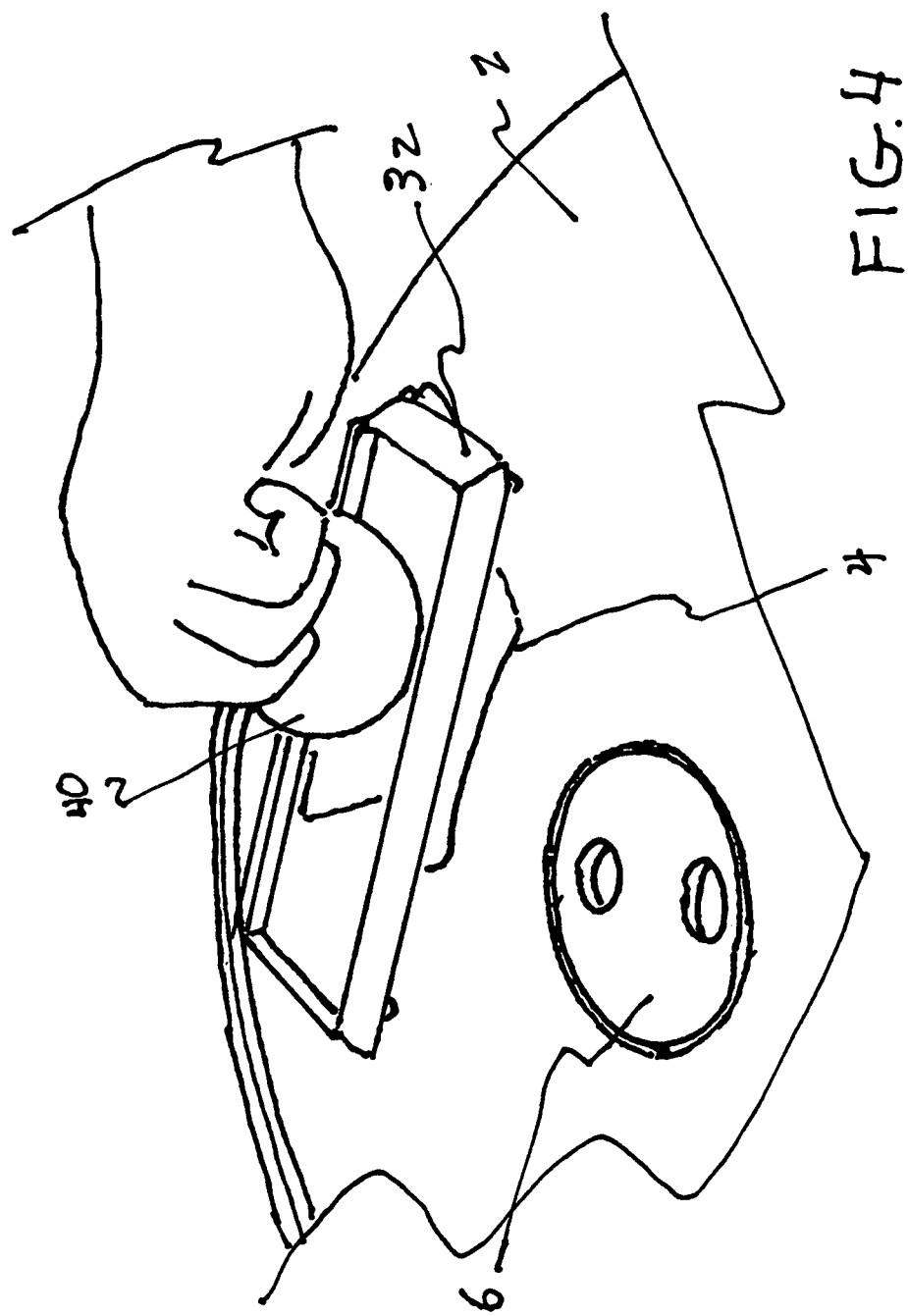
FIG. 4 is a partial perspective view of the mandolin feature of the invention.

FIG. 4 is a partial perspective view of the invention showing a mandolin 32 in place over aperture 4. The user is slicing an onion and the sliced pieces are dropping directly into the tray segment 10 underneath.

The present invention 100 allows a person to deposit chopped or cut food items directly into a plurality of tray segments while not taking up additional useful space on the cutting board surface.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A cutting board assembly comprising:
   a rigid planar surface oriented in a horizontal direction;
   a segmented tray;
   a plurality of vertically directed supports each fixedly attached to an underside of said rigid planar cutting surface;
   a plurality of nonslip feet each fixedly attached to the underside of a vertically directed support member;
   a tray turning knob centrally attached to an upper surface of said segmented tray;
   a rotary bearing assembly;
   a food retaining curb removably attached to either the left or right side of said rigid planar surface;
   said rigid planar surface having a first aperture matching the perimeter of one segment of said segmented tray;
   said rigid planar surface having a second aperture that receives said tray turning knob;
   said segmented tray being circular in shape and having a plurality of segments radiating around the perimeter of said segmented tray;
   said rotary bearing assembly centrally mounted to the underside of said segmented tray;
   enabling a user to cut items on the top surface of said rigid planar surface and slide them into one of the segments of said segmented tray and turn said segmented tray by rotating said turning knob so that a new segment of said segmented tray is available for receiving additional cut items.

2. A cutting board assembly as claimed in claim 1 further comprising a fastener for removably attaching a mandolin or grater to cover the said first aperture of said rigid planar surface.

3. A cutting board assembly as claimed in claim 1 further comprising a downwardly sloping rigid member hingedly attached to said rigid planar surface allowing the user to slide waste items from said rigid planar surface into a sink or other disposal area.

* * * * *